(12) United States Patent
Lam et al.

(10) Patent No.: US 9,621,611 B2
(45) Date of Patent: Apr. 11, 2017

(54) PROVIDING CONTENT IN A PLATFORM-SPECIFIC FORMAT

(71) Applicant: Apple Inc., Cupertino, CA (US)

(72) Inventors: Joelle L. Lam, San Jose, CA (US); Maxim V. Stepanov, San Carlos, CA (US); Sonal Patidar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 76 days.

(21) Appl. No.: 14/319,931

(22) Filed: Jun. 30, 2014

(65) Prior Publication Data
US 2015/0381687 A1 Dec. 31, 2015

(51) Int. Cl.
G06F 15/16 (2006.01)
H04L 29/06 (2006.01)
G06F 17/30 (2006.01)
H04L 29/08 (2006.01)

(52) U.S. Cl.
CPC ...... *H04L 65/602* (2013.01); *G06F 17/30905* (2013.01); *H04L 67/2823* (2013.01)

(58) Field of Classification Search
CPC ............... G06F 17/211; G06F 17/2264; G06F 17/30179; H04L 67/2823
USPC .................................................. 709/201, 246
See application file for complete search history.

(56) References Cited

U.S. PATENT DOCUMENTS

| | | | |
|---|---|---|---|
| 6,925,595 B1 * | 8/2005 | Whitledge | G06F 17/30905 707/999.004 |
| 7,162,697 B2 | 1/2007 | Markel | |
| 8,650,480 B2 * | 2/2014 | Sahota | H04L 67/325 715/234 |
| 2002/0046237 A1 * | 4/2002 | Yokokura | H04L 29/06 709/203 |
| 2008/0189360 A1 * | 8/2008 | Kiley | G06F 17/30867 709/203 |
| 2011/0307808 A1 * | 12/2011 | Giambalvo | G06F 9/4443 715/760 |
| 2012/0047425 A1 | 2/2012 | Ahmed | |
| 2012/0226971 A1 | 9/2012 | Tocchini et al. | |
| 2013/0145259 A1 * | 6/2013 | Kiefer, III | G06Q 30/02 715/249 |
| 2014/0009474 A1 | 1/2014 | Joshi et al. | |
| 2014/0096014 A1 | 4/2014 | Johnson et al. | |
| 2014/0129925 A1 * | 5/2014 | Faletski | G06F 17/2247 715/234 |
| 2014/0289640 A1 * | 9/2014 | Poornachandran | G06F 17/212 715/745 |

* cited by examiner

*Primary Examiner* — Phuoc Nguyen
(74) *Attorney, Agent, or Firm* — Blakely, Sokoloff, Taylor & Zafman LLP

(57) ABSTRACT

Systems and methods for transforming and sending generic content into a platform-specific format or receiving pre-transformed platform-specific content. The generic content and platform-specific format includes one or more tiles that are modified as part of the transformation. An electronic device requests content, and a smart tile processor converts the generic content to platform-specific content before sending the platform-specific content to the requesting electronic device.

29 Claims, 14 Drawing Sheets

PROVIDING CONTENT IN A PLATFORM-SPECIFIC FORMAT

BACKGROUND

The present disclosure relates generally to receiving and displaying content on electronic devices.

This section is intended to introduce the reader to various aspects of art that may be related to various aspects of the present disclosure, which are described and/or claimed below. The background information discussed herein should provide the reader with a better understanding of various aspects of the present disclosure. Accordingly, it should be understood that these statements are to be read in this light, and not as admissions of prior art.

When viewing electronic content, a user may view the content using a variety of devices. The devices may have different display capabilities, operating systems, and/or applications running thereon. However, the electronic content that the user is viewing may not be formatted for the electronic device. Some electronic devices may download all content in a generic format and may attempt to display the content in the generic format. Alternatively, the electronic devices may download all content in a generic format and attempt to display the content in a format more suitable for displaying the content on the electronic device. However, by downloading all content, the electronic device allocates substantial processing resources and bandwidth to downloading and converting the content.

In some situations, content may be stored in device-specific formats, but in such situations, a designer changes content each time that a change in the content is desired. Thus, any changes to the content may include repetitive changes to each specific content format.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to techniques for tiles of content in a generic format and converting the generic format into platform-specific formats in response to requests from electronic devices before sending the content to the requesting electronic devices. By sending only platform-specific content, the requesting device may use less processing resources and bandwidth that would be used to download all the content in a generic format and converting the content to a format for viewing. Thus, by reducing the consumption of processing resources and bandwidth, the electronic device may reduce power consumption. Furthermore, in situations where the electronic device has a limited bandwidth or a data download limit, it may be desirable to limit data and bandwidth consumption. Less bandwidth consumption is desirable when a connection is relatively slow, a receiving electronic device is battery powered, and/or a connection is data limited (e.g., 2 GB/month).

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to techniques for storing generic content and converting the generic content to platform-specific content in tiles of information before sending the content to a requesting device. Using platform-specific table libraries, a smart tile processor 138 converts the generic content containing smart tiles into a platform-specific language or format for the requesting device. The smart tile processor then returns the platform-specific language or format to the requesting device. By sending only the platform-specific information and data, the requesting device can avoid downloading and parsing generic content into a format suitable for the requesting device. By not parsing the generic content, power consumption and processing resource consumption for the requesting device are reduced. Furthermore, the requesting device does not download information that may not be displayed on the specific platform of the requesting device. Therefore, the requesting device consumes less bandwidth which also further reduces power consumption.

Figure 1:
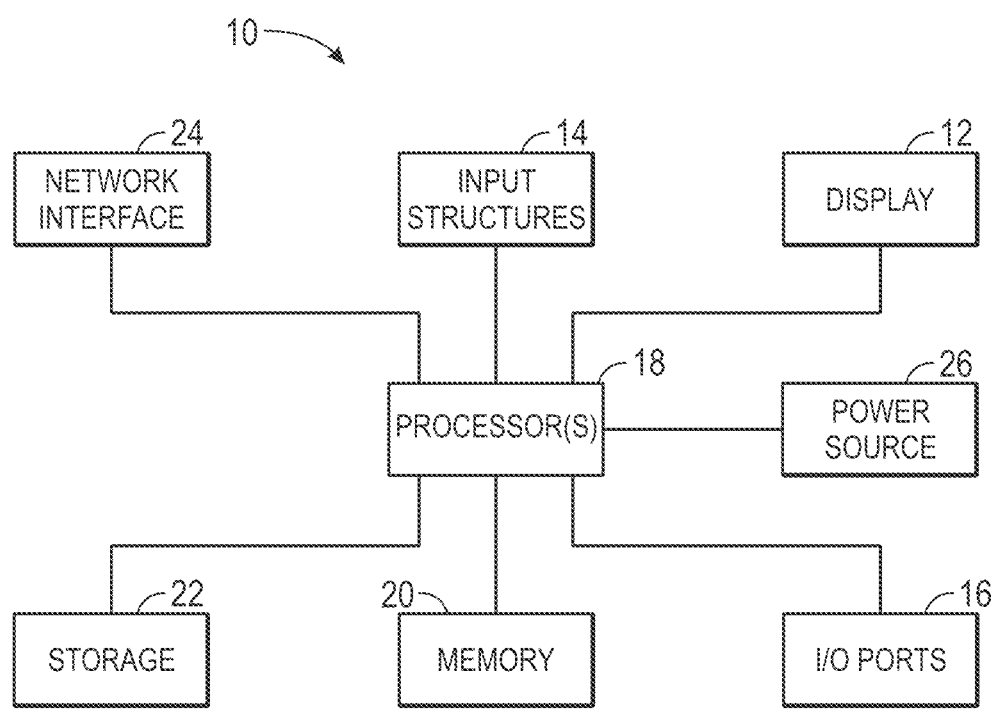
FIG. 1 is a block diagram of an electronic device that may use the techniques disclosed herein, in accordance with an embodiment.
Figure 2:
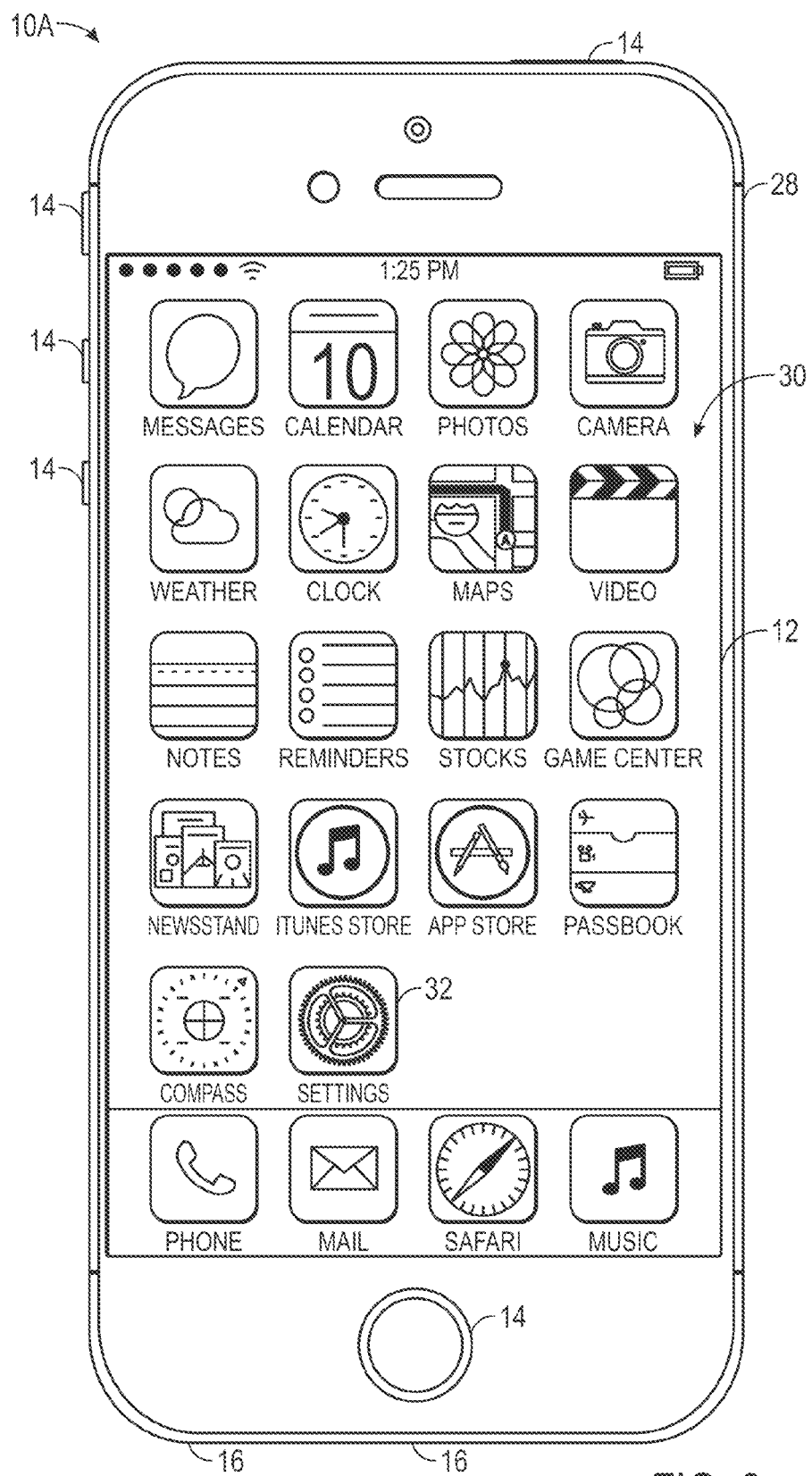
FIG. 2 is a front view of a handheld device, such as an iPhone® by Apple Inc., that may use the techniques disclosed herein, representing an example of the electronic device of FIG. 1, in accordance with an embodiment.
Figure 3:
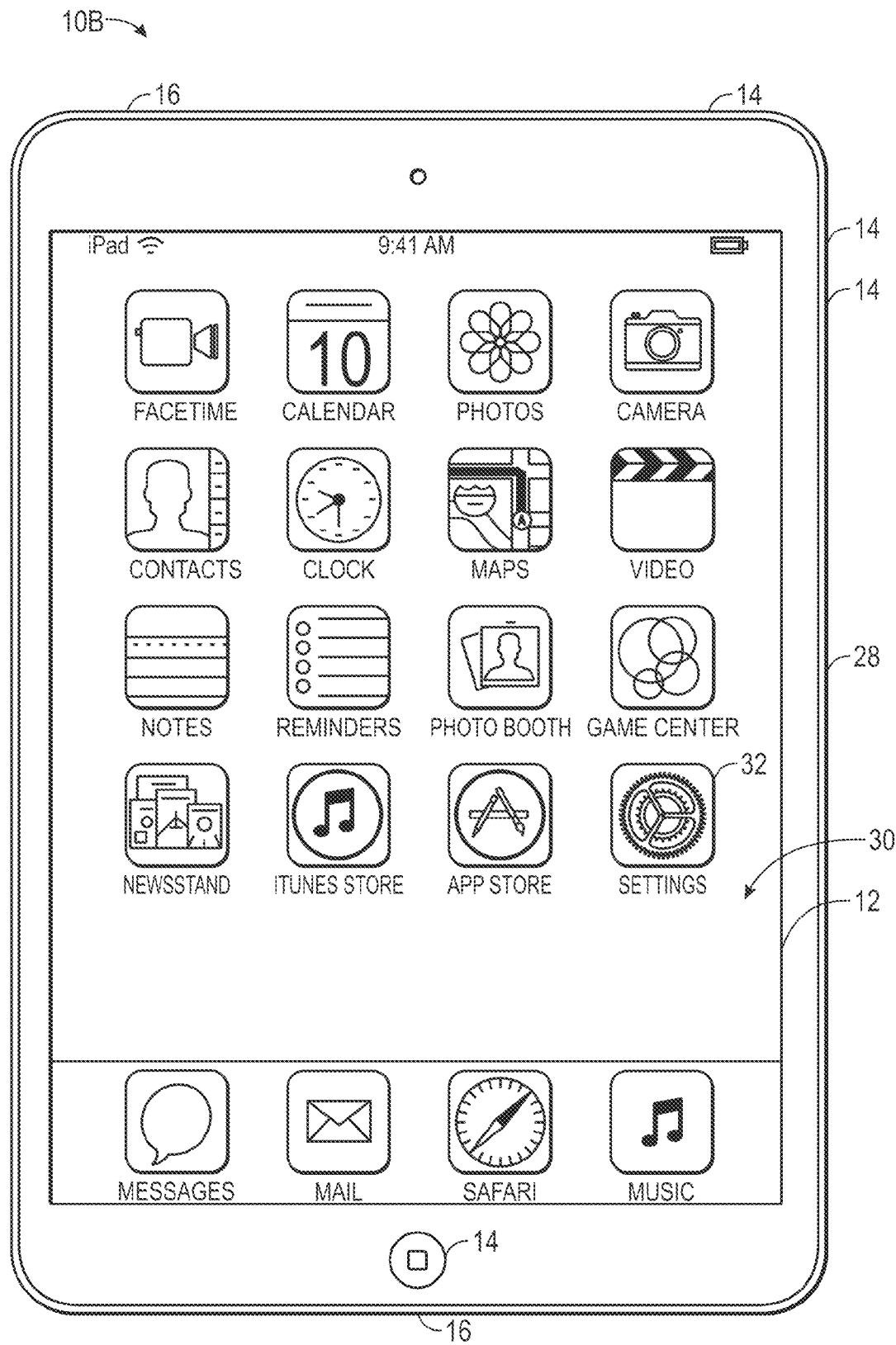
FIG. 3 is a front view of a tablet device, such as an iPad® by Apple Inc., that may use the techniques disclosed herein, representing an example of the electronic device of FIG. 1, in accordance with an embodiment.
Figure 4:
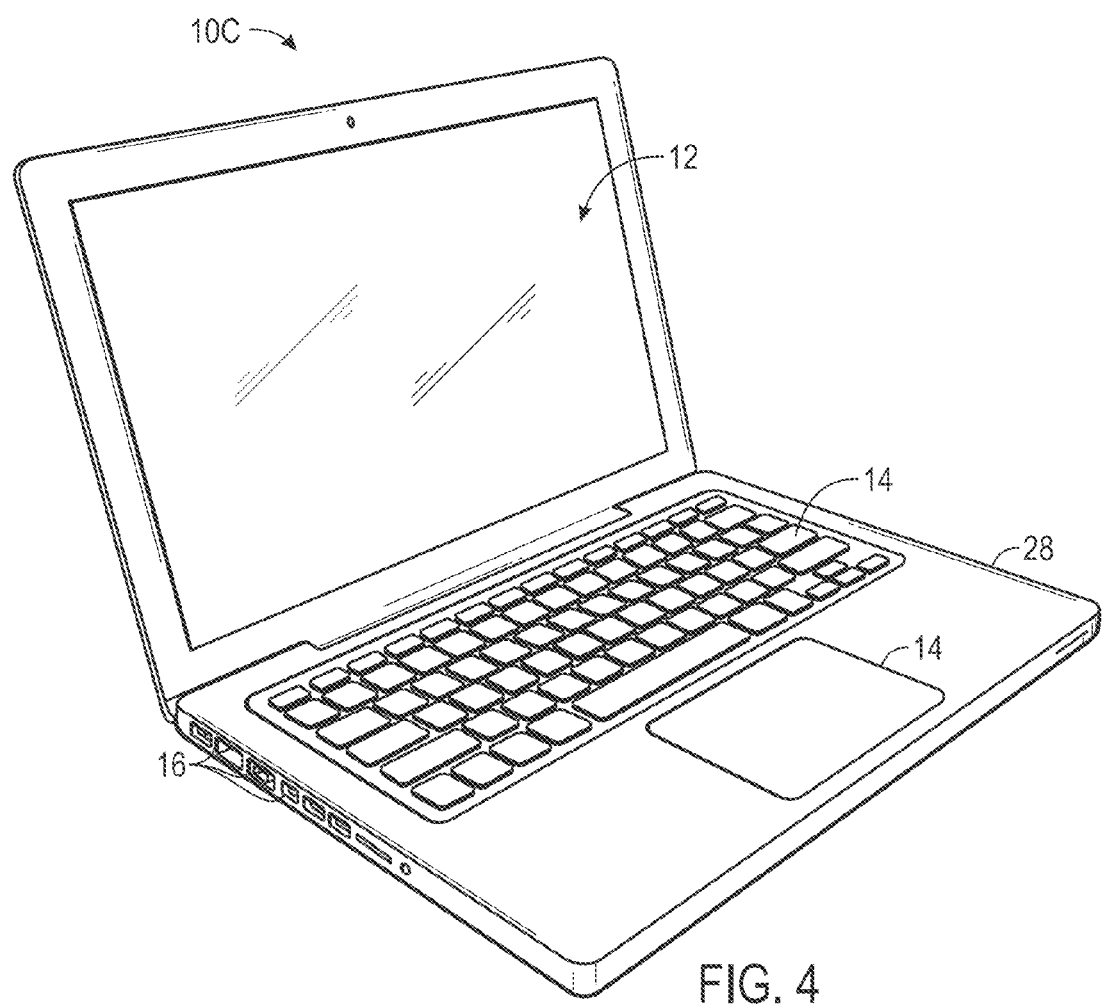
FIG. 4 is a perspective view of a notebook computer, such as a MacBook Pro® by Apple Inc., that may use the techniques disclosed herein, representing an example of the electronic device of FIG. 1, in accordance with an embodiment.

A variety of suitable electronic devices may employ the techniques described herein. FIG. 1, for example, is a block diagram depicting various components that may be present in a suitable electronic device 10. FIGS. 2, 3, and 4 illustrate example embodiments of the electronic device 10, depicting a handheld electronic device, a tablet computing device, and a notebook computer, respectively.

Turning first to FIG. 1, the electronic device 10 may include, among other things, a display 12, input structures 14, input/output (I/O) ports 16, one or more processor(s) 18, memory 20, nonvolatile storage 22, a network interface 24, and a power source 26. The various functional blocks shown in FIG. 1 may include hardware elements (including circuitry), software elements (including computer code stored on one or more tangible, non-transitory, computer-readable media) or a combination of both hardware and software elements. It should be noted that FIG. 1 is merely one example of a particular implementation and is intended to illustrate the types of components that may be present in the electronic device 10. Indeed, the various depicted components (e.g., the processor(s) 18) may be separate components (e.g., graphics processing unit, central processing unit, etc.), components of a single contained module (e.g., a system-on-a-chip device), or may be incorporated wholly or partially within any of the other elements within the electronic device 10. The components depicted in FIG. 1 may be embodied wholly or in part as machine-readable instructions (e.g., software or firmware), hardware, or any combination thereof.

By way of example, the electronic device 10 may represent a block diagram of the handheld device depicted in FIG. 2, the tablet computing device depicted in FIG. 3, the notebook computer depicted in FIG. 4, or similar devices, such as desktop computers, televisions, servers, and so forth. In the electronic device 10 of FIG. 1, the display 12 may be any suitable electronic display used to display image data (e.g., a liquid crystal display (LCD) or an organic light emitting diode (OLED) display). In some examples, the display 12 may represent one of the input structures 14, enabling users to interact with a user interface of the electronic device 10. In some embodiments, the electronic display 12 may be a MultiTouch™ display that can detect multiple touches at once. Other input structures 14 of the electronic device 10 may include buttons, keyboards, mice, trackpads, and the like. The I/O ports 16 may enable electronic device 10 to interface with various other electronic devices.

The processor(s) 18 and/or other data processing circuitry may execute instructions and/or operate on data stored in the memory 20 and/or nonvolatile storage 22. The memory 20 and the nonvolatile storage 22 may be any suitable articles of manufacture that include tangible, non-transitory, computer-readable media to store the instructions or data, such as random-access memory, read-only memory, rewritable flash memory, hard drives, and optical discs. By way of example, a computer program product containing the instructions may include an operating system (e.g., OS X® or iOS by Apple Inc.) or an application program (e.g., iBooks® by Apple Inc.).

The network interface 24 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The power source 26 of the electronic device 10 may be any suitable source of energy, such as a rechargeable lithium polymer (Li-poly) battery and/or an alternating current (AC) power converter.

As mentioned above, the electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPod® or iPhone® available from Apple Inc. of Cupertino, Calif.

The handheld device 10A may include an enclosure 28 to protect interior components from physical damage and to shield them from electromagnetic interference. The enclosure 28 may surround the display 12, which may display a graphical user interface (GUI) 30 having an array of icons 32. By way of example, one of the icons 32 may launch an application program (e.g., iBooks® by Apple Inc.). User input structures 14, in combination with the display 12, may allow a user to control the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Touchscreen features of the display 12 of the handheld device 10A may provide a simplified approach to controlling the application programs. The handheld device 10A may include I/O ports 16 that open through the enclosure 28. These I/O ports 16 may include, for example, an audio jack and/or a Lightning® port from Apple Inc. to connect to external devices. The electronic device 10 may also be a tablet device 10B, as illustrated in FIG. 3. For example, the tablet device 10B may be a model of an iPad® available from Apple Inc.

In certain embodiments, the electronic device 10 may take the form of a computer, such as a model of a MacBook®, MacBook® Pro, MacBook Air®, iMac®, Mac® mini, or Mac Pro® available from Apple Inc. By way of example, the electronic device 10, taking the form of a notebook computer 10C, is illustrated in FIG. 4 in accordance with one embodiment of the present disclosure. The depicted computer 10C may include a display 12, input structures 14, I/O ports 16, and a housing 28. In one embodiment, the input structures 14 (e.g., a keyboard and/or touchpad) may be used to interact with the computer 10C, such as to start, control, or operate a GUI or applications (e.g., iBooks® by Apple Inc.) running on the computer 10C. Furthermore, in some embodiments, the electronic device 10 may include server and/or cloud computing devices.

Figure 5:
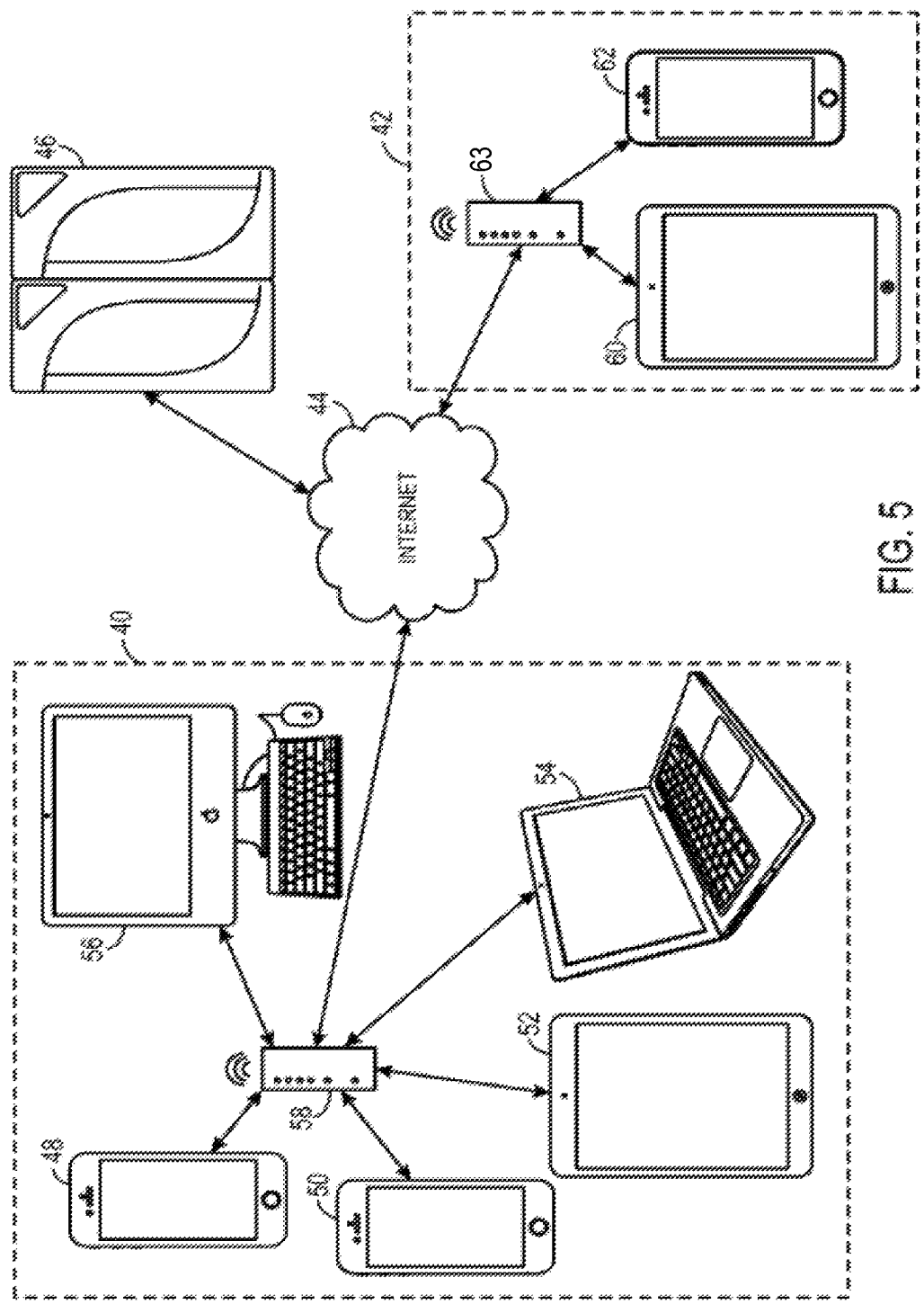
FIG. 5 illustrates an interconnection between electronic devices, such as the electronic devices of FIGS. 1-4, in accordance with an embodiment.

With the preceding in mind, FIG. 5 illustrates a block diagram view of an interconnection of various electronic devices 10. As illustrated, local networks, such as networks 40 and 42, may interconnect via the Internet 44 and/or other wide area networks. Additionally, the networks 40 and 42 may connect to one or more servers 46 through local networks and/or wide area networks (e.g., the Internet 44). The servers 46 may include one or more locally-connected or distributed computing devices, storage devices, and/or data warehouse appliances. Each of the networks includes one or more electronic devices 10. For example, the network 40 includes handheld devices 48 and 50, a tablet device 52, a notebook computer 54, and a desktop computer 56 each connected to the Internet 44 and each other via a router 58, and the network 42 includes a tablet device 60 and a handheld device 62 connected to each other and the Internet 44 via a router 63. Each of the devices in the networks 40, 42 may be connected to the router 58 or the router 63 using a wired (e.g., Ethernet) or wireless (e.g., WiFi) connection. Moreover, in some embodiments, a single network may include more than one router. In certain embodiments, one or more electronic devices may be connected directly to the Internet 44 without a router but directly connected with or without an external modem. Additionally, in some embodiments, one or more of the electronic devices 10 may directly connect to each other within a respective network. For example, the tablet device 52 may connect to the notebook computer 54 using a wired (e.g., USB) or wireless (e.g., Bluetooth or WiFi) connection.

Tiles of Content

Figure 6:
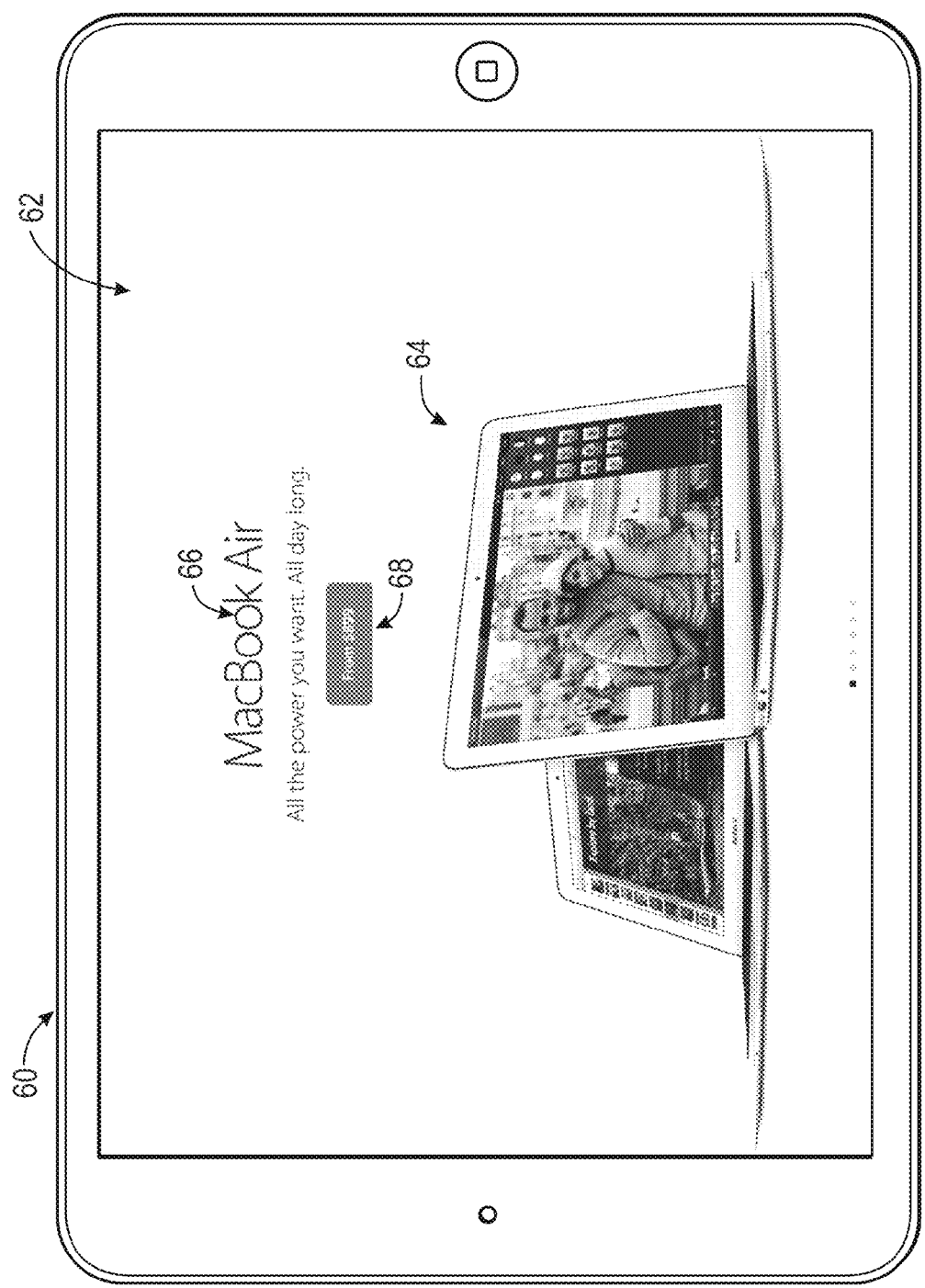
FIG. 6 illustrates a screen having a single tile that may be displayed by the electronic device of FIGS. 1-4, in accordance with an embodiment.

Each of the electronic devices 10 may receive content from remote or local devices (e.g., the servers 46). These images may be used to present the content, where the content is subdivided into tiles. As will be discussed below, the tiles may be dynamically styled based on a platform for the viewing electronic device. FIG. 6 illustrates an electronic device 60 (e.g., iPad Air™ available from Apple Inc.) that is displaying content 62 in the form of a single tile. As illustrated, the content 62 and its respective tiles may include one or more images 64. The images 64 may depict information and/or one or more perspective views of a depicted object that the designer of the content wants to display to a user viewing the content 62. In certain embodiments, the content 62 and its respective tiles include text information 66, such as information relating to information being displayed in the tile. For example, if a depiction of an item (e.g., an MacBook Air® available from Apple Inc.) is being viewed, the text information 66 may include a title, a description, a price, review information, slogans, and/or other information that a designer of the content 62 may want to share with a user viewing the content 62. In some embodiments, the content 62 and its respective tiles may also include one or more user input portions 68 that enable the user to select, manipulate, or input various options for navigating and or manipulating the tile. In some embodiments, the user input portion 68 may enable the user to navigate to within the content 62 and/or to additional content. For example, the user input portion 68 may include a link to another webpage where the user may purchase the object depicted in the images 64. Additionally or alternatively, the user input portion 68 may enable the user to rotate perspectives of the depicted object and/or scroll through displayed images or tiles. In some embodiments, the user input portion 68 may enable a user to resize or reshape bounds for one or more tiles displayed in the content 62. In some embodiments, the user input portion 68 may be combined with another portion. For example, a user input portion 68 may be invisible to a user, but the user input portion 68 may cover at least a portion of an image portion or a textual portion. For example, when the user clicks on an image portion or textual portion, the user input portion 68 may be selected because the user input portion 68 overlays the part of the textual portion or image portion intended to be selected.

Figure 7:
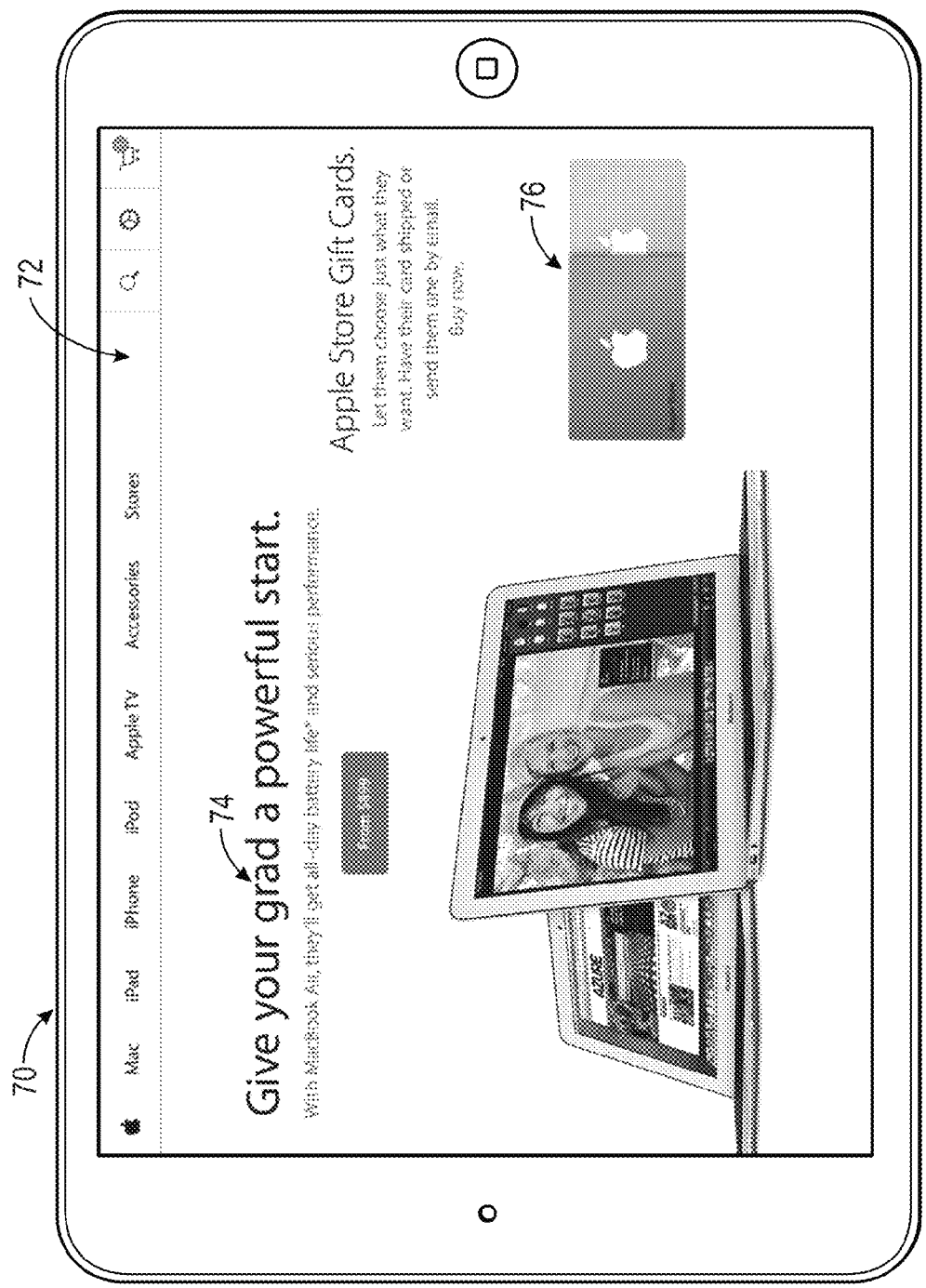
FIG. 7 illustrates a screen having two tiles that may be displayed by the electronic devices of FIGS. 1-4, in accordance with an embodiment.
Figure 8:
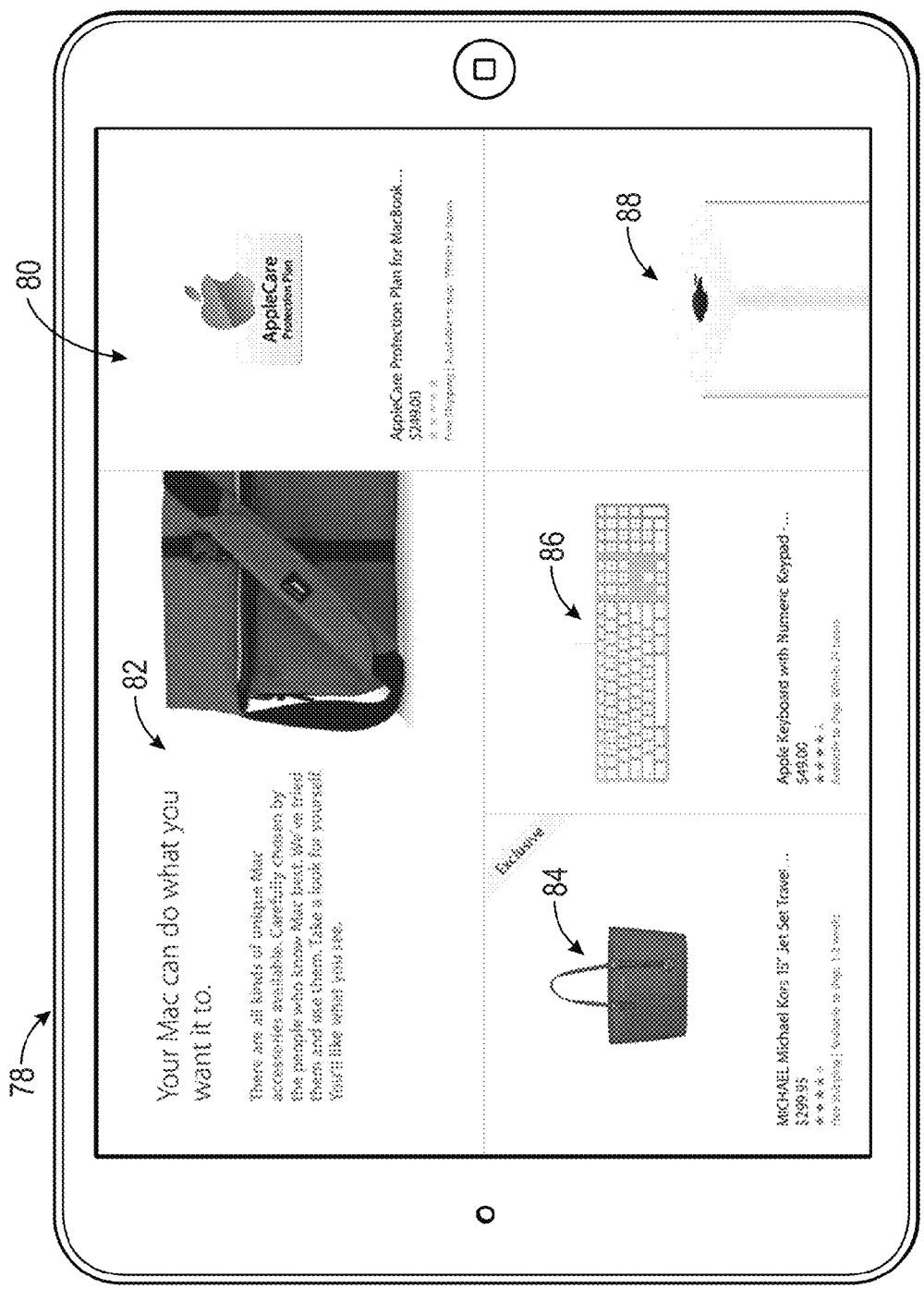
FIG. 8 illustrates a screen having five tiles that may be displayed by the electronic devices of FIGS. 1-4, in accordance with an embodiment.

In some embodiments, content displayed on an electronic device may include more than one tile. For example, FIG. 7 illustrates an electronic device 70 displaying content 72 which includes a first tile 74 and a second tile 76. As may be appreciated, each tile 74 and 76 may include any of the features that may be included in the single tile of content 62 described in relation to FIG. 6 above. FIG. 8 illustrates an electronic device 78 that is displaying content 80 that includes tiles 82, 84, 86, and 88. In other embodiments, the tiles 82-88 may be resized and arranged to be fully encompassed in a single screen of the electronic device 78. However, in other embodiments—such as the illustrated embodiment—the content 80 may extend beyond a single screen of the electronic device 78. Specifically, in the illustrated embodiment, the content 80 includes the tile 88 that extends beyond the screen. In some embodiments, the content 80 may enable the user viewing the content 80 to scroll the entire screen to reveal additional portions of the content 80. Additionally or alternatively, the content 80 may enable the user to scroll through the content 80 independently. In such scenarios, the user may select the tile 88 and scroll actions may be performed on the tile 88 without changing any of the remaining tiles in the content 80. In some embodiments, the scrolling may be performed in response to receiving user inputs (e.g., a swipe, a mouse movement, a key, a mousewheel movement, etc.) via the input structures 14.

Smart Tiles Based on Device Orientation

Figure 9A:
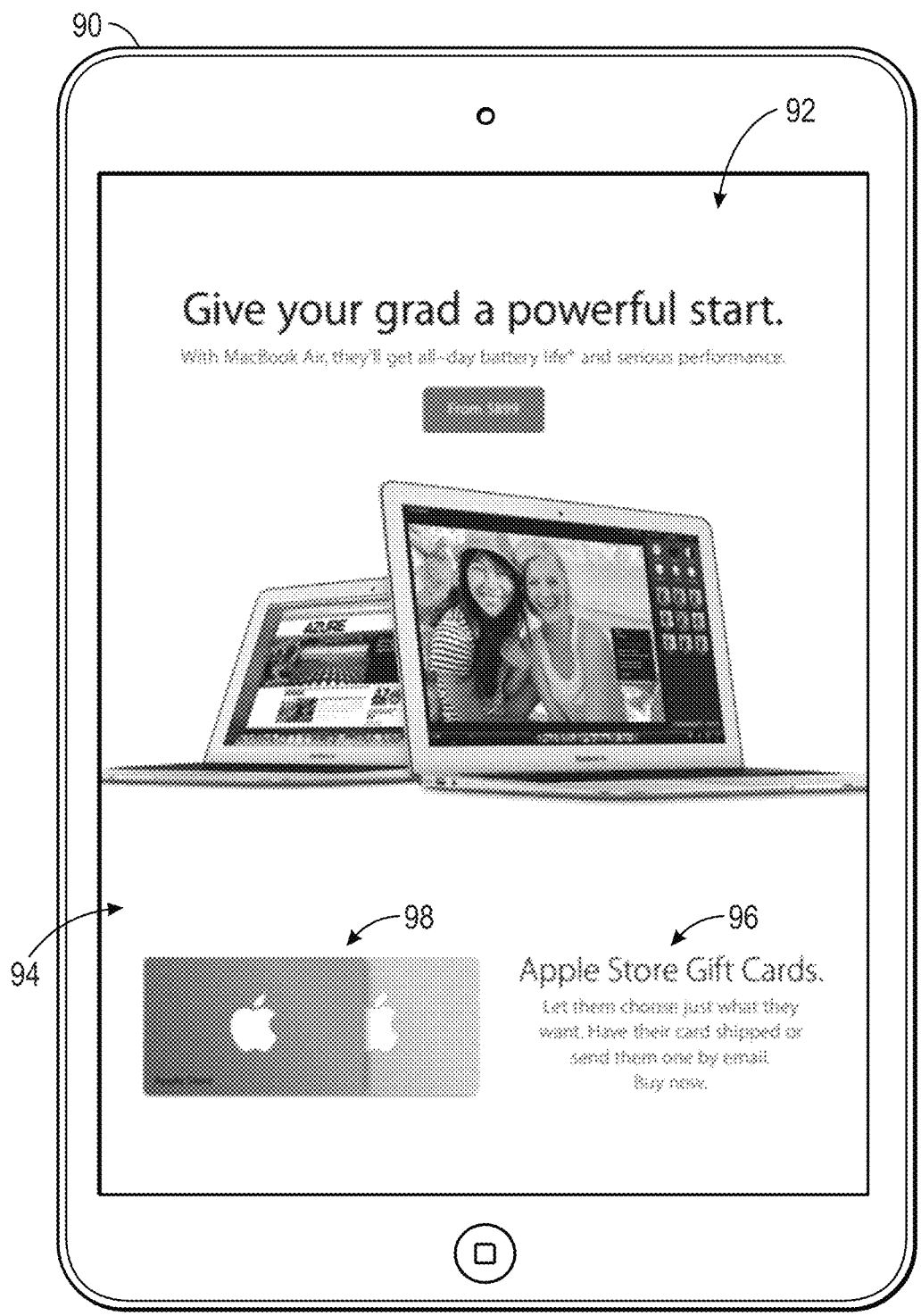
FIG. 9A illustrates a screen having two tiles that may be displayed by the electronic devices of FIGS. 1-4 when the devices are in a portrait orientation, in accordance with an embodiment.
Figure 9B:
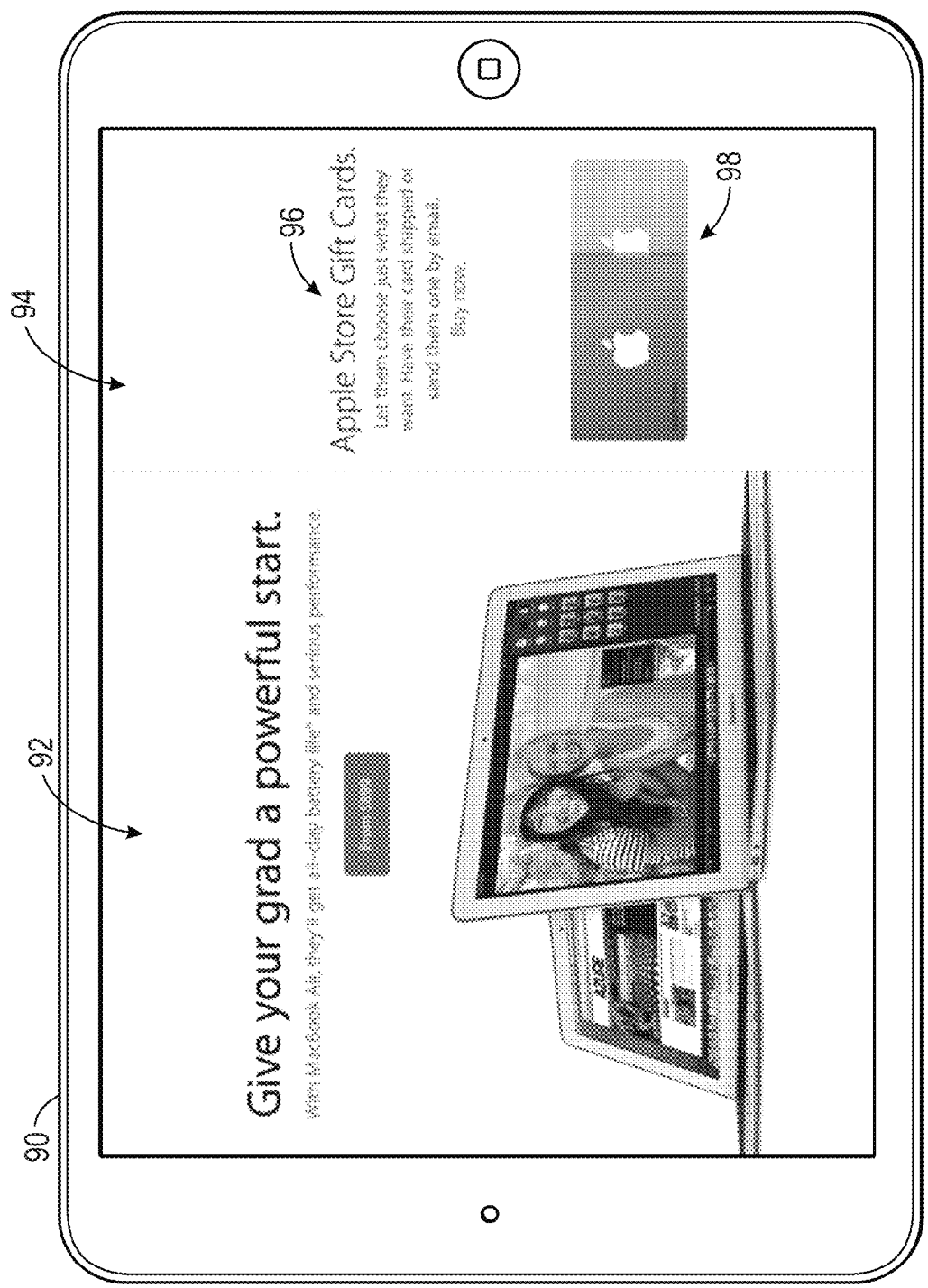
FIG. 9B illustrates a screen having two tiles that may be displayed by the electronic devices of FIGS. 1-4 when the devices are in a landscape orientation, in accordance with an embodiment.

In some embodiments, a single content may be desired to be displayed differently on different platforms or orientations when viewing the content. For example FIGS. 9A and 9B illustrate content that may be displayed differently based on an orientation of the electronic device 90 used to view the content. As illustrated, the content includes a first and second tile 92 and 94 that have their own information. In some embodiments, the tiles 92 and 94 may be arranged according to an orientation of the electronic device 90. For example, the first and second tiles 92 and 94 may be arranged in a horizontal, side-by-side orientation when the electronic device 90 is in a portrait orientation and a vertical orientation when the electronic device 90.

In some content where more than two tiles exist, a first subset of the tiles may be grouped into a first grouping, and a second subset of the tiles may be grouped in a second group. The tiles within each group may form general shapes such as squares or rectangles. For example, in some embodiments, the first subset may be approximately equivalent in shape (e.g., square) to the first tile 92, and the second subset may be approximately equivalent in shape (e.g., a rectangle) to the second tile 94 when the related content is displayed on a platform (e.g., operating system, application, and/or device type) for the electronic device 90. Thus, in such embodiments, the first subset of tiles may remain substantially the same in shape when a device is rotated, but when the electronic device 90 is rotated, the tiles in the second subset may rearrange from forming a horizontally-oriented rectangle to a vertically-oriented rectangle, or vice versa.

Additionally or alternatively, in embodiments where more than two tiles exist, the tiles may be arranged in an orientation to fill one direction (e.g., horizontal or vertical) of a display for the electronic device 90 in a first row or column. Additional tiles may then be used to fill empty space in the other direction (e.g., horizontal or vertical) until the display is covered and/or the tiles are all represented. Moreover, in some embodiments, there may be more tiles to display than available real estate of a display. Accordingly, in some embodiments, the additional tiles may be presented such that a user may scroll to see the additional images. Additionally or alternatively, some tiles may be omitted from being displayed by the electronic device 90. In some embodiments where the tiles are added to the display until the display is full, tiles may be prioritized so that higher priority tiles may be used to fill the display before lower priority tiles. In some embodiments, at least one of the lower priority tiles may be omitted from being displayed on at least one platform while being displayed on at least one other platform.

Furthermore, in some embodiments, individual tiles may appear differently based on an orientation of the electronic device 90. For example, the second tile 94 includes a textual portion 96 and an image portion 98 that may be arranged, sized, omitted, or oriented within a display based on an orientation of the electronic device 90 having the display. For example, the textual portion 96 and the image portion 98 may be arranged in a horizontal orientation when the electronic device 90 is in a portrait orientation, but the textual portion and the image portion 98 may be arranged in a vertical orientation when the electronic device 90 is in a landscape orientation. Additionally, in embodiments where the second tile 94 includes more than two portions, the portions may be used to fill the second tile 94 in a manner consistent with more than two tiles filling a display, as previously discussed.

In some embodiments, tiles may be given limits that constrain changes in appearance. For example, one or more tiles may be assigned a minimum size or height-to-width ratio such that the display of the tile will not be changed beyond a threshold set by a designed for the content.

Smart Tiles Displayed on Different Platforms

Figures 10A, 10B:
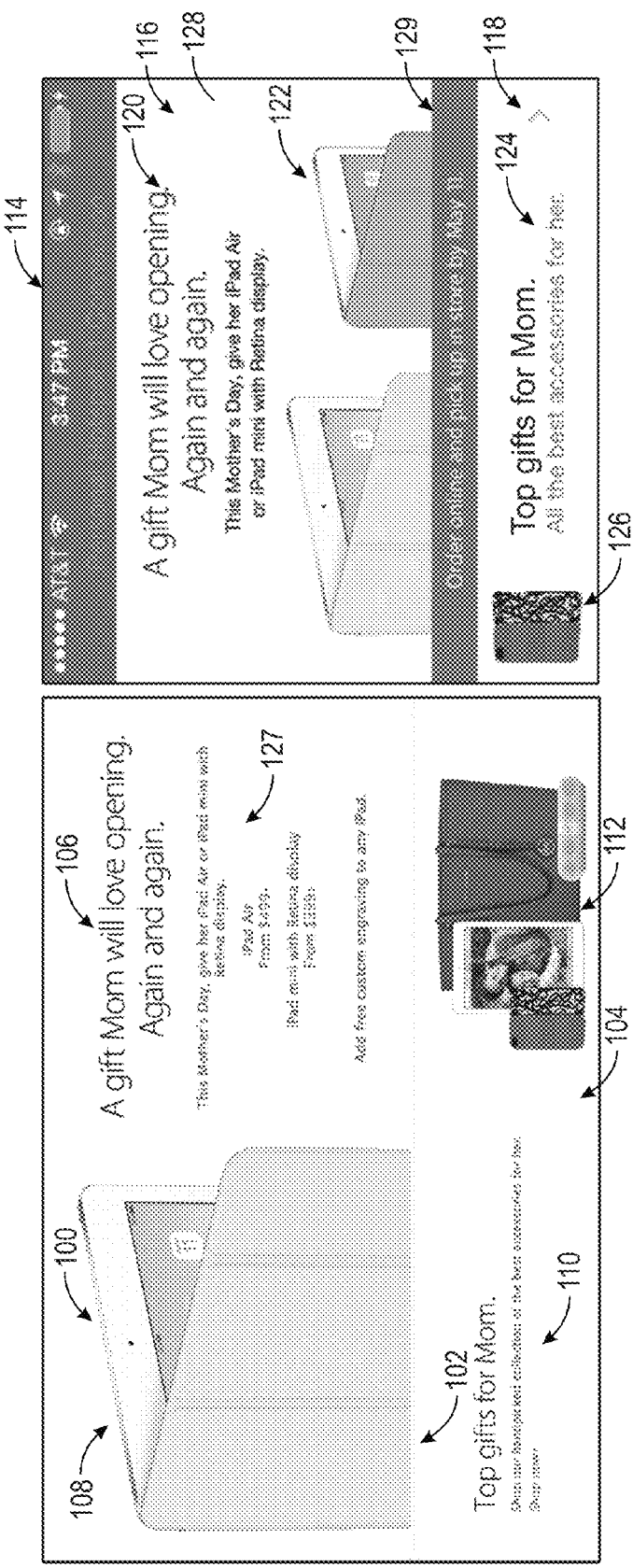
FIG. 10A illustrates a first platform-specific format of content that may be displayed on an electronic device having a first platform, in accordance with an embodiment.
FIG. 10B illustrates a second platform-specific format of the content of FIG. 10A that may be displayed on an electronic device having a second platform different from the first platform of FIG. 10B, in accordance with an embodiment.

Smart tiles may vary based on a type of platform used to display the smart tiles. For example, FIGS. 10A and 10B illustrate an appearance of the same generic content as displayed between two different platforms (e.g., iPhone® and iPad Air™ respectively) FIG. 10A illustrates a screen 100 that may be presented via a first platform (e.g., operating system or application running on a tablet). As illustrated, the screen 100 includes a first tile 102 and a second tile 104. The first tile 102 has a textual portion 106 and an image portion 108, and the second tile 104 has a textual portion 110 and an image portion 112. Similarly, FIG. 10B illustrates a screen 114 that may be presented via a second platform (e.g., an operating system or application running on a smartphone). The screen 114 includes a first tile 116 that corresponds to the first tile 102. The screen 114 also includes a second tile 118 that corresponds to the second tile 104. Specifically, as illustrated, the first tile 116 includes a textual portion 120 and an image portion 122, and the second tile 118 includes a textual portion 124 and image portion 126. As illustrated, the textual portion 106 of the first tile 102 of screen 100 corresponds to the textual portion 120 of the first tile 116 of screen 114, and the image portion 108 of the first tile 102 of the screen 100 corresponds to the image portion 122 of the first tile 116 of the screen 114. Moreover, the textual portion 110 of the second tile 104 of the screen 100 corresponds to the textual portion 124 of the second tile 118 of the screen 114. Similarly, the image portion 112 of the second tile 104 of the screen 100 corresponds to the image portion 126 of the second tile 118 of the screen 114.

Although the substance of the corresponding portions may vary somewhat, at least some of the substance may be presented in corresponding portions. For example, the textual portions 106 and 120 contain some of the same text, but the textual portion 106 includes additional text 127 that is not displayed in the textual portion 120. In some embodiments, an electronic device displaying the screen 114 may not receive that additional text 127 to reduce bandwidth consumption of the electronic device. Furthermore, text may be styled differently (e.g., different font, size, colors, bold, italics, etc.) on different platforms. For example, text styles may be tailored to a platform for ease of reading or for asthetics based on the platform. For instance, on a platform running on an electronic device with a higher dot density (i.e., dots per inch DPI), the text size may be increased over a platform running on an electronic device with a lower DPI.

Corresponding image portions between platforms may also vary. For example, the image portion 108 generally corresponds to the image portion 122. However, the image portion 122 includes additional image content 128 that is not included in the image portion 108. In some embodiments, the additional image content 128 may be an additional image included in the image portion 122 that is not included in the image portion 108. In other embodiments, when the content is converted for consumption by the electronic device displaying the screen 100, the additional image content 128 is cropped out of the image portion 108, or the images displayed in the image portion 108 and the image portion 122 are different images that are derived from a generic content and received by the different platforms. In some embodiments, the additional image content 128 may be omitted from the screen 100 based on the platform. For example, if the platform is being displayed on an iPad Mini™, an iPad Mini™ may be omitted from the image portion 108. Moreover, similar to the image portions 108 and 122, the image portion 126 may be included in the image portion 112. In some embodiments, the content may dynamically vary between platforms in other forms, such as orientation of tiles, border sizes of one or more objects, presence of video, number of tiles, size of insets for objects, number of objects in the content, and the like. In some embodiments, one or more platforms may display information that is not displayed via at least one other platform. For instance, the screen 114 includes the notification 129, but the screen 100 does not.

Smart Tile Processing

Figure 11:
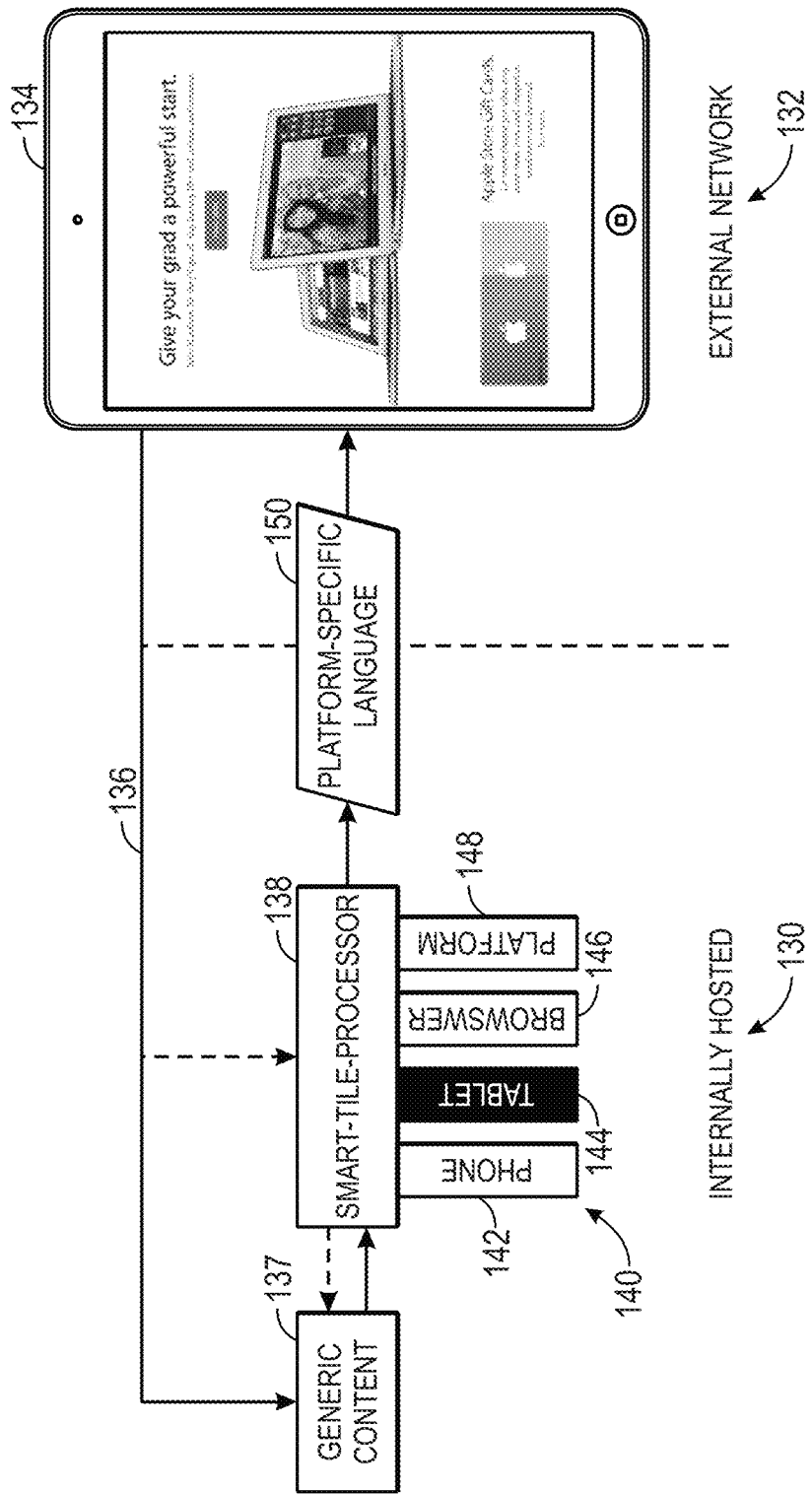
FIG. 11 illustrates a system used to pre-convert content from a generic platform to a format specific to a tablet platform, in accordance with an embodiment.

FIG. 11 illustrates a block diagram illustrating transmission of content between an internal network 130 and an external network 132. In some embodiments, the internal network 130 may include more than one connected network. Specifically, the internal network 130 includes one or more servers 46 interconnected either in a local area network, distributed network, and/or through a wide area network (e.g., the Internet). The servers 46 store information that may be retrieved from the external network 132. The external network 132 includes one or more external devices running on respective platforms. For example, the illustrated external network 132 includes a tablet device 134. The tablet device 134 sends a content request 136 for content stored in a generic content repository 137. In some embodiments, the content request 136 includes an identifier—such as a metadata tag—of a platform of the requesting device (e.g., the tablet device 134).

The generic content repository 137 may be stored in memory of the servers 46 or may be stored in memory of other servers, which is accessible by the servers 46. The generic content stored within the generic content repository 137 includes one or more smart tiles to be presented to a viewing user upon request from an electronic device (e.g., the tablet device 134). The generic content may include any information that a designer of the content may want to display on several platforms. In some embodiments, the generic content includes information (e.g., textual and image information) that may be displayed on any available platform and information that may be displayed on only a portion of available platforms. In some embodiments, the information in the generic content may be stored without specific style identifiers. In other embodiments, the information in the generic content may be stored in a generic format that may be changed by a smart tile processor 138 that processes generic content for display on respective platforms. In certain embodiments, the content may be stored in a generic format using a suitable format, such as XML, HTML, or other suitable markup languages. In some embodiments, the smart tile processor 138 may include the servers 46 and/or other suitable electronic devices with processors and memory (e.g., non-transitory, computer-readable medium) for storing instructions for execution by the processors.

In certain embodiments, the request 136 is received directly by the generic content repository 137. Additionally or alternatively, the request 136 is received by the smart tile processor 138. In either case, the generic content repository 137 passes the generic content to the smart tile processor 138. Upon receipt of generic content and/or the request, the smart tile processor 138 transforms the generic data using one or more platform-specific libraries 140 used to convert data into a format readable by the requesting platform type. By generating the platform-specific content after the request and/or receiving the generic content, the transformed content is fresh content rather than stale content that has previously been transformed, such that the platform-specific content may be as current as the generic content at the time of the request. In some embodiments, the libraries 140 may include style sheets for each platform library. For example, the libraries 140 may include a phone library 142, a tablet library 144, a browser-based library 146, a generic (or default) library 148, and/or additional libraries for other platforms. In some embodiments, the generic library 148 may be omitted if the generic content is stored in a generic format. Furthermore, each library may include nested libraries. For example, the phone library 142 may include individual libraries each specific to an individual platform. For example, each library in the phone library 142 may be directed to a different phone manufacturer and/or operating system.

Also, some of the libraries 140 may include situation-specific styles, such as low-bandwidth styles that include lower quality or less images to reduce bandwidth consumption. Furthermore, the situation specific information may be included in the request 136 when sent by the requesting device.

Using the platform-specific table library 144, the smart tile processor 138 converts the generic content into a platform-specific language 150 or format for the tablet device 134. The smart tile processor 138 then returns the platform-specific language 150 or format to the requesting device. By sending only the platform-specific information and data. The requesting device does not parse generic content into a format suitable for the requesting device. By not parsing the generic content, power consumption and processing resource consumption for the requesting device are reduced. Furthermore, the requesting device does not download information that may not be displayed on the specific platform of the requesting device. Therefore, the requesting device consumes less bandwidth which also further reduces power consumption. Moreover, by converting the content using the smart tile processor 138 instead of the generic content repository 137, server load may be distributed such that one or more smart tile processors 138 may be employed without substantially limiting resources associated with the generic content repository 137.

Figure 12:
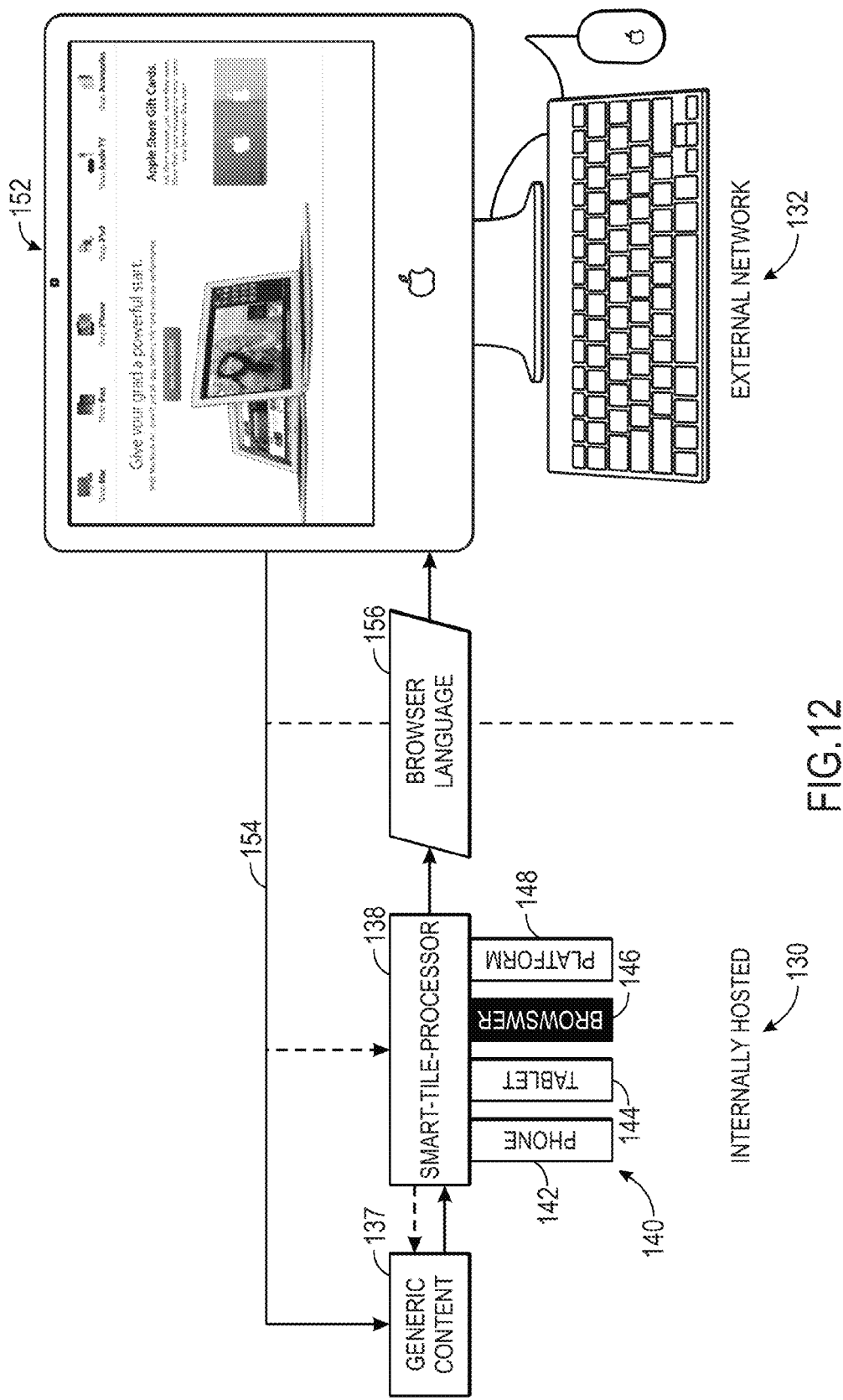
FIG. 12 illustrates a system used to pre-convert content from a generic format to a format specific to a browser platform, in accordance with an embodiment.
Figure 13:
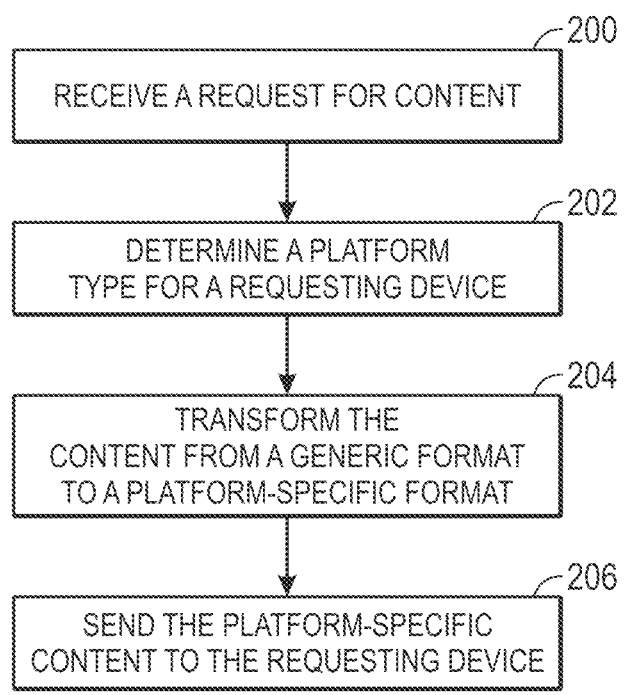
FIG. 13 illustrates a flowchart that represents a process that may be employed to pre-convert content from a generic format to a platform-specific format.

FIG. 12 illustrates the internal network 130 and external network 132 of FIG. 11. As illustrated in FIG. 12, the external network 132 includes a computer 152 as the requesting device sending a content request 154 to the generic content repository 137 and/or the smart tile processor 138. In response to content request 154, the smart tile processor 138 translates the generic content into a browser language 156 (e.g., HTML or other markup language) using the browser library 146. In certain embodiments, the generic content may be stored in one language (e.g., Extensible Markup Language XML or JavaScript Object Notation JSON) and translated into another language (e.g., HTML or a device-hardware- or device-software-specific language) readable by the requesting device. In some embodiments, the translation may merely include changing a style for one or more smart tiles within the content. Moreover, the browser library 146 may include sub-libraries that include different browser languages or browser type information. These sub-libraries may be further utilized by the smart tile processor to format the tiles more specifically for display on the requesting device (e.g., computer 152).

In some embodiments, a single electronic device may include more than a single platform. For example, an electronic device may have different platforms based on application programs running on the electronic device. In such embodiments, the electronic device may request content in a platform-specific format for any available platform, and the electronic device may receive platform-specific formatted content for any of the available platforms. For example, the electronic device may request the content using a browser-based application program and receive the content in a platform-specific format for the browser-based application, and/or the electronic device may request the content using a non-browser-based application program (e.g., a specific use application program) and receive the content in a different platform-specific format the non-browser-based application program.

Example Conversion

Generic data may be stored in an XML format, such as indicated in Table 1 below:

TABLE 1

Generic Content

```
<?xml version="1.0" encoding="utf-8"?>
<tile xmlns="http://store.company.com/smarttile/v1">
    <markdown id="markdown-0">
#![AppleTV](project:tab-appletv-l-logo-01232014.png)
##Watch the latest blockbuster movies and TV shows in 1080p HD. And
play content from your iPhone, iPad, or iPod touch wirelessly using
AirPlay. [$99] (http://www.company.com)
    </markdown>
    <image id="image-0" src="project:tab-appletv-l-topmovies-01242014.jpeg"/>
</tile>
```

Table 1 identifies a smart tile that includes text identified by the markdown tag. In other words, the tile includes a textual portion that states "Watch the latest blockbuster movies and TV shows in 1080p HD. And play content from your iPhone, iPad, or iPod touch wirelessly using AirPlay." As indicated by the markdown tag, the text is stored as plain text without a format. The smart tile also includes images of an Apple TV® and Top Movies image. The tile also includes a link to enable a user to navigate to an appropriate page. Thus, the generic content includes information without styling the information. Instead, the smart tile processor 138 transforms the generic content into a platform-specific format using libraries (e.g., style sheets). For example, when translating the generic content into for a tablet platform, the smart tile processor 138 may convert the generic content using a style sheet, such as the style sheet partially reproduced in Table 2 below:

TABLE 2

Tablet Platform Style Sheet

```
h2 {
    font-size: 18;
    line-height: 1.2;
    font-family: MyriadSet-Text;
    color: rgb(102, 102, 102);
    text-align: center;
    width: 100%;
}
a {
    color: rgb(255, 255, 255);
    content-edge-insets: insets (14.0, 25.0, 14.0, 25.0);
    background-image: url('http://nc1-dc1-as-images-t');
    background-image-insets: insets(8,8,8,8);
    background-image-resizeMode: stretch;
    top: 40;
}
a: highlighted {
    background-image: url ('http://nc1-dc1-as-image-h');
}
```

Table 2 identifies platform-specific style information such as font type, font size, text color, text alignment, text width, background colors, background images, insets for the content, insets for the background image, and an edge beyond which content is not displayed within the tile. Using the information in the style sheet (or other suitable library) the generic content may be reshaped into a desired format for a specific platform.

FIG. 12 illustrates a method of transmitting data that may be performed by the smart tile processor. The smart tile processor 138 receives a request for content (block 200). In some embodiments, the request may include a direct request from a requesting device (e.g., computer 152). In certain embodiments, the request may include a sending of an indication of a request along with generic content from the generic content repository 137. The smart tile processor 138 determines a platform type for the requesting device (block 202). In some embodiments, the smart tile processor 138 determines the platform type from the request with platform-specific identification (e.g., platform type of the requesting device and routing information for sending the platform-specific content to the requesting device) included in the request. Additionally or alternative, the smart tile processor 138 may request such information from the requesting device. The smart tile processor 138 may also receive a tile of the generic content from the generic content repository 137 in a generic format (block 204). In some embodiments where the smart tile processor 138 receives the request from the generic content repository 137, this receipt is done concurrently with the request. In certain embodiments, when the smart tile processor 138 receives a request, the smart tile processor 138 retrieves at least one tile from the generic content repository 137.

Using a suitable library, the smart tile processor 138 transforms the generic content from the generic format to a platform-specific format specific to a platform of the device (block 206). In some embodiments, transforming the generic content includes modifying or adding formatting to the generic content. In certain embodiments, transforming the generic content includes translating an original language (e.g., XML) of the generic content into another language (e.g., HTML). Once the platform-specific content has been created from the generic content, the smart tile processor 138 may send the platform-specific content to the requesting device.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A tangible, non-transitory, computer-readable medium storing instructions that, when executed by a processor, causes the processor to:

receive a request for content from a remote device, wherein the request includes platform specific information comprising a model identifier that indicates a platform of the remote device;

determine one or more platform-specific libraries corresponding to the platform of the remote device requesting the content using the platform information;

receive the content in a generic format from a content storage, wherein the generic format of the content lacks formatting information;

subdividing the content into a plurality of tiles, the subdividing based upon the platform information;

in response to the request, transforming each tile in the plurality of tiles that make up the content from the generic format to a specific format based on the platform information of the remote device, wherein transforming the content comprises modifying the tile of the content from the generic format to the specific format using the one or more platform-specific libraries; and
send the specific format of each of the plurality of tiles to the remote device.

2. The tangible, non-transitory, computer-readable medium of claim 1, wherein modifying the tile comprises rearranging components of the tile.

3. The tangible, non-transitory, computer-readable medium of claim 1, wherein transforming the content comprises transforming the content into orientation specific formats for the platform of the remote device.

4. The tangible, non-transitory, computer-readable medium of claim 1, wherein the instructions are configured to cause the processor to receive the request from the content storage, and wherein receiving the request and the tile of content are done substantially concurrently.

5. The tangible, non-transitory, computer-readable medium of claim 1, wherein receive the request comprises receiving the request directly from the remote device.

6. The tangible, non-transitory, computer-readable medium of claim 1, wherein transforming the content comprises translating the content from a first language to a second language.

7. The tangible, non-transitory, computer-readable medium of claim 6, wherein the second language comprises a language selected based at least in part on a platform type of the remote device.

8. A method comprising:
receiving a request for content from a remote device, wherein the request includes platform information comprising a model identifier that indicates a platform of the remote device;
determining one or more platform-specific libraries corresponding to the platform of the remote device requesting the content using the platform information;
receiving the content in a generic format from a content storage, wherein the generic format of the content lacks formatting information;
subdividing the content into a plurality of tiles, the subdividing based at least in part on the platform information;
in response to the receiving the content, transforming the each tile of the in the plurality of tiles that make up the content from the generic format to a specific format based on the platform information of the remote device, wherein transforming the content comprises modifying an appearance of the content from the generic format to the specific format comprises modifying the tile of the content from the generic format to the specific format using the one or more platform-specific libraries; and
sending the plurality of tiles in the specific format of the content to the remote device.

9. The method of claim 8, wherein at least one of the platform-specific libraries comprises a model-specific library.

10. The method of claim 8, wherein only the specific format of each of the plurality of tiles is sent, and no generic format tiles are sent.

11. The method of claim 8, wherein the platform comprises a device type of the remote device.

12. The method of claim 8, wherein the platform comprises an operating system running on the remote device.

13. The method of claim 8, comprising transforming the content from the generic format to a low-bandwidth format, wherein the low-bandwidth format include fewer images or lower quality images to reduce bandwidth consumption for the content.

14. The method of claim 8, comprising including a first portion of information content from the content when formatted in a first platform-specific format and not including the first portion of the information content when formatted in a second platform-specific format.

15. The method of claim 14, wherein the generic content comprises a first image and a second image, and wherein including information from the content in the first platform-specific format and not in the second platform-specific format comprises:
including the first image and not the second image of the content when formatted in the first platform-specific format; and
including the first and second images of the content when formatted in the second platform-specific format.

16. An electronic device comprising:
a processor;
a memory storing instructions configured to cause the processor to perform operations comprising:
receiving a request for content from a remote device, wherein the request includes platform information comprising a model identifier that indicates a platform of the remote device;
determining one or more platform-specific libraries corresponding to the platform of the remote device requesting content using the platform information;
receiving the content in a generic format from a content storage, wherein the generic format of the content lacks formatting information;
subdividing the content into a plurality of tiles, the subdividing based upon the platform information
in response to receiving the content
transforming each tile of the plurality of tiles of content from the generic format to a specific format based on the platform information of the remote device, wherein transforming the content comprises modifying the tile of the content from the generic format to the specific format specific using the one or more platform-specific libraries; and
sending the specific format of the each of the plurality of tiles of content to the remote device.

17. The electronic device of claim 16, wherein the libraries are stored in the memory.

18. The electronic device of claim 16, wherein the libraries comprise a phone library, a tablet library, and a browser-based library.

19. The electronic device of claim 16, wherein the phone and tablet libraries comprise sub-libraries for different manufacturers, operating system, or both.

20. A method comprising:
sending a request for content for a first or second platform from an electronic device to a remote server, the request comprising first or second platform information respectively, wherein platform information comprises a platform identifier that indicates a platform of the first or second platform of the electronic device, the platform including a model identifier of the electronic device or an application identifier of an application on the electronic device; and
receiving the content as a plurality of tiles that make up the content from the remote server in a first recently-converted platform-specific format specific to the first platform when the request is for the first platform; and receiving the content from the remote server in a second recently-converted platform-specific format specific to the second platform when the request is for the second platform.

21. The method of claim 20, wherein the first and second platforms comprise different application programs running on the electronic device.

22. The method of claim 21, wherein the first platform comprises a browser-based application and the second platform comprises a non-browser based application.

23. A electronic device comprising:
a processor;
a memory storing instructions configured to cause the processor to:
send a request for content from the electronic device to a remote server, the request including platform information that includes a platform identifier indicating a first or a second platform of the electronic device, wherein a platform includes an application identifier of an application on the electronic device or a model identifier of the electronic device;
receive the content as a plurality of tiles that make up the content from the remote server in a first recently-converted platform-specific format specific to the first platform when the request is for the first platform, and;
receiving the content as a plurality of tiles that make up the content from the remote server in a second recently-converted platform-specific format specific to the second platform when the request is for the second platform.

24. The system of claim 16, wherein the memory stores one or more libraries used to transform the content from the generic format to the specific format.

25. The system of claim 24, wherein each library in the one or more libraries comprises settings for transforming the content from the generic format to a different specific format.

26. The method of claim 1, wherein the subdividing of the content into tiles takes into account the display of the tiles in both portrait and landscape format.

27. The method of claim 1, further comprising:
detecting an orientation of the remote device, wherein the orientation is one of landscape or portrait; and
subdividing the content into a plurality of tiles comprises sizing at least one of the plurality of tiles in accordance with the detected orientation of the remote device.

28. The method of claim 27, further comprising:
sending to the remote device an arrangement of the plurality of tiles for displaying the content on the remote device; wherein the arrangement takes into account the orientation of the remote device.

29. The method of claim 1, wherein at least one tile of content is resizable by the user.

* * * * *